Oct. 10, 1950     R. A. GARRAND     2,525,216

TOOLHOLDER

Filed Aug. 24, 1945

Inventor
Ralph A. Garrand
by Wright, Brown, Quinby & Macy
Attys.

Patented Oct. 10, 1950

2,525,216

UNITED STATES PATENT OFFICE 2,525,216

TOOLHOLDER

Ralph A. Garrand, Windsor, Vt., assignor to Cone Automatic Machine Company Inc., Windsor, Vt., a corporation of Vermont Application August 24, 1945, Serial No. 612,324

2 Claims. (Cl. 90—55)

This invention relates to tool holders and has for an object to so support a tool that when it is presented to work, the surface of which is being moved toward the cutting edge, initial contact with the work causes the tool to feed in to a predetermined depth and as soon as the tool passes off from the work at the end of the cut, it is immediately retracted therefrom automatically.

For a complete understanding of this invention, reference may be had to the accompanying drawings in which Figure 1 is a side elevation of a tool holder embodying the invention, a work piece being shown in end elevation.

Figures 4, 6, 7:
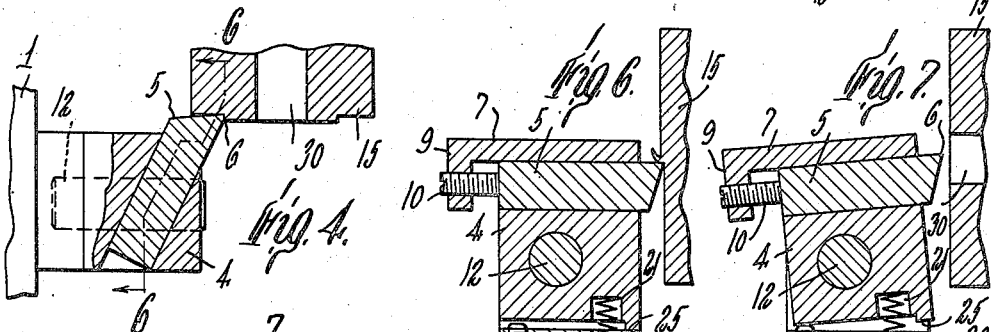
Figure 4 is a view partly in top plan and partly broken away and in section showing the tool in cutting position.
Figure 5:
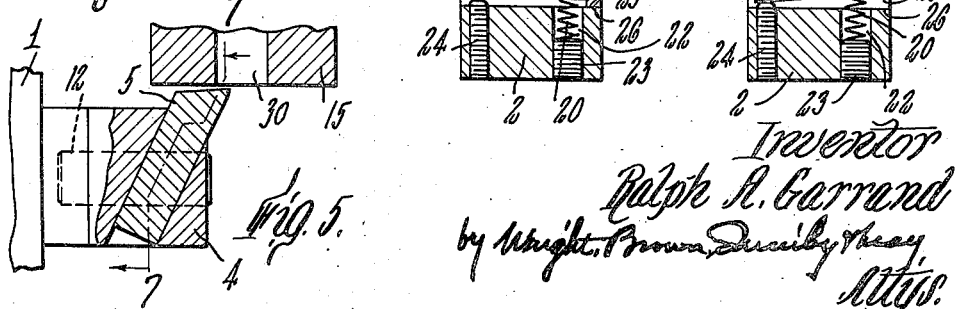
Figure 5 is a view similar to Figure 4, but showing the position of the parts just after completion of the cut with the tool automatically retracted from the work.

Figures 6 and 7 are detail sectional views on lines 6—6 and 7—7 of Figures 4 and 5, respectively.

Figure 1:
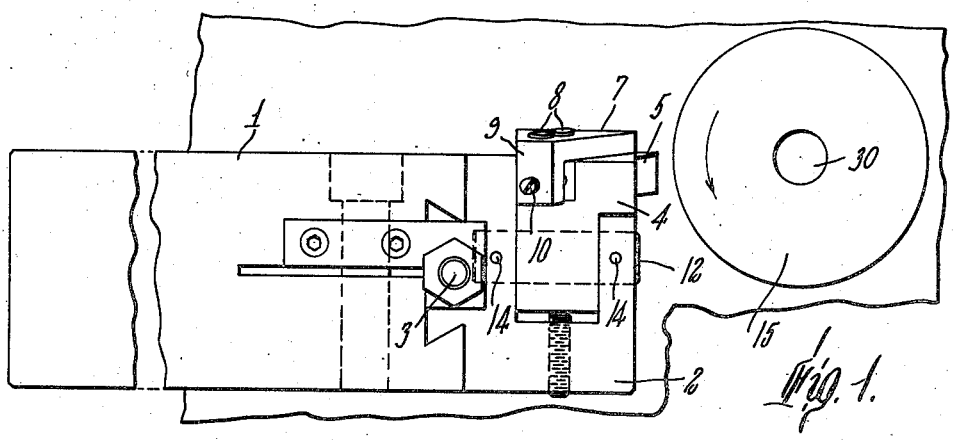
Figures 2, 3:
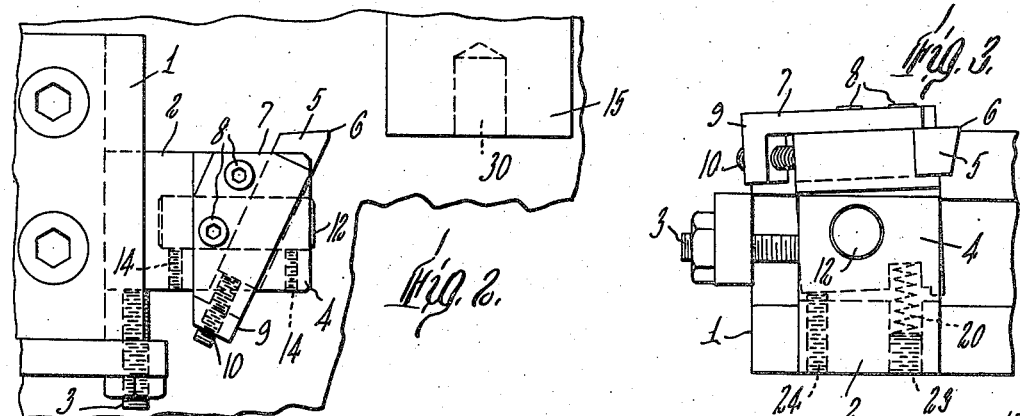
Figure 2 is a fragmentary top plan view of the same.
Figure 3 is a front end elevation of the same.

Referring to the drawings, at 1 is shown a supporting shank for the tool to which is secured a head 2 adjustable on the shank as by a screw 3. The head 2 forms a support for a tool-carrying block 4. This block 4 has a tool bit 5 provided with a cutting edge 6 at one end. This bit may be clamped against the block by a retaining plate 7 secured by screws 8 and having a flange portion 9 extending back of the rear end of the tool bit 5 through which an adjusting screw 10 passes which engages the rear end of the tool bit. The block 4 is pivoted to the head 2, and for this purpose there is shown a pivot pin 12 which may be secured in position by cross locking pins 14, this pin 12 bridging a slot in the supporting head 2 within which the block 4 extends and is pivoted. It will be noted that this pivot 12 is back of the cutting edge 6 of the tool bit so that when this cutting edge is presented to work, as the work 15 of Figure 1, pressure of the work thereon as the work and tool are relatively moved in cutting relation rocks the block about the pivot in a direction to feed the cutting edge into the work face.

The block 4 is normally held in tool-retracting position as by a spring 20 seated in mating sockets 21 in the block 4 and 22 in the supporting head 2. This spring is positioned on the same side of the pivot pin 12 as is the tool bit 5 and back of this tool bit. A threaded plug 23 may be used to close the outer end of the socket 22. The limit or retraction of the tool by rocking about the pivot 12 is determined by an adjustable stop 24 formed as a screw extending through the head 2, the parts being shown in tool retracted positions in Figure 7. When the tool is presented to the rotating work in this position of the parts, engagement of the work against the cutting edge rocks the block 4 against the action of the spring 21 as far as permitted by engagement of stops 25 and 26 on the block and supporting head, into the position shown in Figure 6, the tool then biting into the surface of the work as shown in this figure, the pressure of the work thereagainst holding the tool bit in this position. As soon as the tool comes to the end of the work, as, for example, where it runs into a central hole 30 therein in the construction shown, work pressure which was holding the tool into the work is released, and the tool is automatically thrown out by the spring 20 into the position shown in Figure 7 clear of the work. The tool holder may now be retracted across the work face while the tool is out of contact therewith without requiring that the holder be moved axially away from the work. Thus on the return stroke of the tool holder, the tool is automatically held relieved from the work so that no scoring of the work results. As soon, however, as the tool is presented in cutting relation thereto, the engagement of the work against the tool pushes the tool into feed position where it continues as long as the pressure is exerted by the work on the tool.

From the foregoing description of an embodiment of this invention, it should be evident to those skilled in the art that various changes and modifications might be made without departing from its spirit or scope.

I claim:

1. In combination, a support, a block, a tool carried by said block and having a cutting edge, means mounting said block on said support for limited rocking motion about an axis back of said cutting edge providing for swinging motion of said cutting edge by pressure of work thereagainst to one limit of such motion representing a projected position, and yielding means engaging said block and tending to hold said block at its other limit of swinging motion with said cutting edge in retracted position in which it will engage the work and be moved thereby to said projected position in the next cutting stroke.

2. In combination, a support, a block, a tool carried by said block and having a cutting edge, a pivot back of said cutting edge fixing said block to said support, cooperating stops on said support and block limiting the rocking of said block in direction to project said cutting edge, adjustable stop means limiting the rocking of said block on said pivot in the opposite direction to retract said cutting edge, and a compression spring reacting between said block and support on the same side of said pivot as is said tool and back of said tool yieldingly holding said block in cutting edge retracted position in which it will engage the work and be moved thereby to said projected position in the next cutting stroke.

RALPH A. GARRAND.

REFERENCES CITED

The following references are of record in the file of this patent:

UNITED STATES PATENTS

| Number | Name | Date |
|---|---|---|
| 1,775,963 | McCarroll | Sept. 16, 1930 |
| 1,985,049 | McShane | Dec. 18, 1934 |

FOREIGN PATENTS

| Number | Country | Date |
|---|---|---|
| 12,485 | Great Britain | Aug. 7, 1889 |
| 40,486 | Germany | Aug. 18, 1887 |